April 1, 1969 — B. B. STRANGE — 3,436,722

EXTENDABLE INTRASECTION HYDROPHONE ARRAYS

Filed April 1, 1968 — Sheet 1 of 2

Inventor
Booth B. Strange

By
Michael P. Breston
Attorney

INVENTOR
Booth B. Strange
By
Michael P. Breston
ATTORNEY

United States Patent Office 3,436,722
Patented Apr. 1, 1969

3,436,722
EXTENDABLE INTRASECTION
HYDROPHONE ARRAYS
Booth B. Strange, Houston, Tex., assignor to Western
Geophysical Company of America, Los Angeles, Calif.,
a corporation of Delaware
Filed Apr. 1, 1968, Ser. No. 717,535
Int. Cl. H04b 13/00
U.S. Cl. 340—7   7 Claims

ABSTRACT OF THE DISCLOSURE

This invention relates to improved streamer cables for use in marine seismic exploration and, more particularly, to improved streamer sections each comprising at least two component arrays of hydrophones for detecting reflected seismic waves during marine exploration. Means are provided to detachably interconnect, at the end of each section, the component arrays to obtain composite intrasection arrays for optimum attenuation of noise and of unwanted signals, whereby desirable response curves can be selectively achieved.

Background of the invention

Marine seismic streamer cables to detect reflected sound waves are well known in the art. Such cables are disclosed, for example, in U.S. Patent No. 2,465,696, issued Mar. 29, 1949, to Lee Roy C. Paslay, and in U.S. Patent No. 3,299,397, issued Jan. 17, 1967, to G. M. Pavey, Jr. Typically a streamer cable is formed of a plurality of detachably coupled waterproof sections. Each section includes spaced, pressure-responsive transducers, such as hydrophones, arranged to form a single array. The seismic signals from each array are carried by a separate pair of conductors forming part of a sectioned cable which runs throughout the entire length of the streamer. Each such separate pair of conductors feeds its signals to suitable analog or digital recording equipment on board ship. While the streamer sections are detachable and interchangeable, the sections' individual arrays are fixed.

It is also known to provide in streamers weighted arrays of detectors to achieve tapered weighting or sensitivity in some preferred direction. Several weighting functions and corresponding hydrophone array patterns are described in the literature for obtaining desirable response patterns.

Until this invention, as far as is known, no sections of marine seismic cables were provided with composite arrays formed of component arrays which could be easily and detachably interconnected in the field at the end of each section, without disturbing the integrity and fluidproofness of the sections.

Accordingly it is a primary object of the present invention to provide new and improved streamer sections including component arrays which can be easily and detachably interconnected in the field at the end of each section, to selectively obtain composite intrasection arrays.

It is another object of the present invention to provide new and improved streamer sections including component arrays which can be selectively and detachably interconnected in the field to provide relatively short or long, weighted and/or unweighted arrays, to thereby selectively obtain desired response curves.

Summary of the invention

This invention involves a streamer cable formed of individual detachable sections. Each section houses a primary array and at least one secondary array, each selected to achieve optimum noise rejection and signal selection. Detachable coupling means are operatively connected to the component primary and secondary arrays to allow easy, interarray connections at the end of each section, while maintaining the sections fluidproof. The selectively extendable intrasection component arrays form composite arrays which yield desired response curves.

One of the advantages of the present invention is that it selectively permits the convenient and rapid change of effective array lengths. This is a significant advantage in the field especially when it is desired to combine the characteristics of short arrays, which provide a greater resolution of subsurface detail, with the characteristics of long arrays, which generally have a wider reject band for noise and signals traveling along their axes. Because of the advantageous manner in which the electrical conductors of the component arrays terminate at the end of each section, the section remains waterproof. Thus it is possible to quickly and easily connect and disconnect a number of sections in the field to form continuous streamers of any desired effective length.

The novel features which are believed to be characteristic of the invention, both as to its organization and method of operation, together with further objects and advantages thereof will be better understood from the following description considered in connection with the accompanying drawings, in which presently preferred embodiments of the invention are illustrated by way of example. It is to be expressly understood, however, that the drawings are for the purpose of illustration and description only and are not intended as a definition of the limits of the invention.

Description of the preferred embodiments

Figure 1:
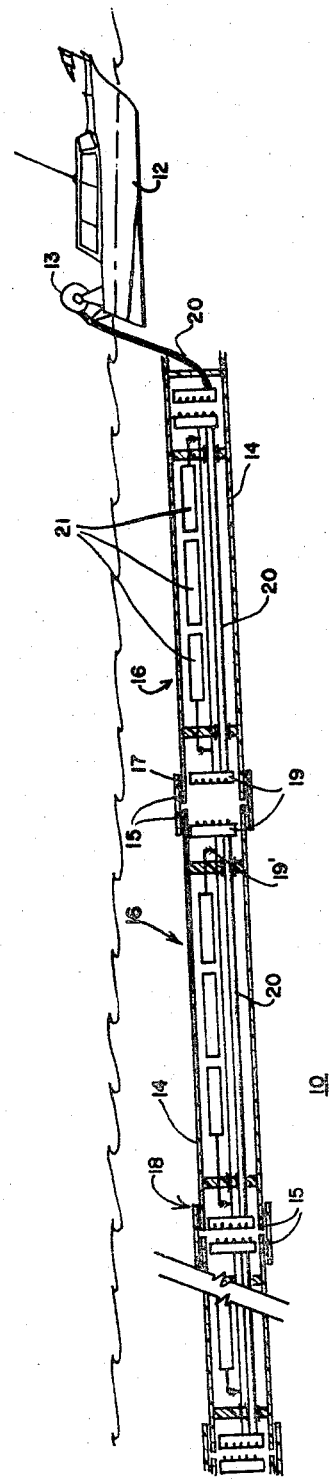
FIGURE 1 shows diagrammatically and partly in section a series of sections coupled to form a seismic streamer.

FIGURE 1 shows generally a seismic streamer cable designated as 10 towed behind a boat 12. A reel 13 on the boat reels out the streamer into the water. Paravane means (not shown) are conventionally attached to cable 10 and arranged to maintain the cable at a predetermined depth below the water surface. The streamer 10 is made up of separate streamer sections 16. Each section consists of a very long flexible pipe 14 having end flanges 15. Pipe 14 is made of a suitable flexible plastic material such as polyvinyl chloride. The flanges 15 of each pair of adjacent pipes 14 are coupled as by a flexible collar 17 to for a detachable joint 18. Each section 16 houses component arrays, generally designated as 21, of pressure detectors or hydrophones adapted to detect pressure variations in the water caused by the detonation of explosive charges (dynamite or gases) or by other known energy sources. At the ends of pipe 14 are provided detachable coupling means 19 connected to a portion of a conductor cable 20, and detachable coupling means 19¹, connected to arrays 21. Cable 20 is arranged to transmit the electric signals generated by the arrays 21 to individual channels in the recording equipment (not shown) carried on ship 12. Sections 16 are constructed to be interchangeable within streamer 10. Hence, identical numerals will be assigned to identical parts for ease of understanding.

Figure 2:
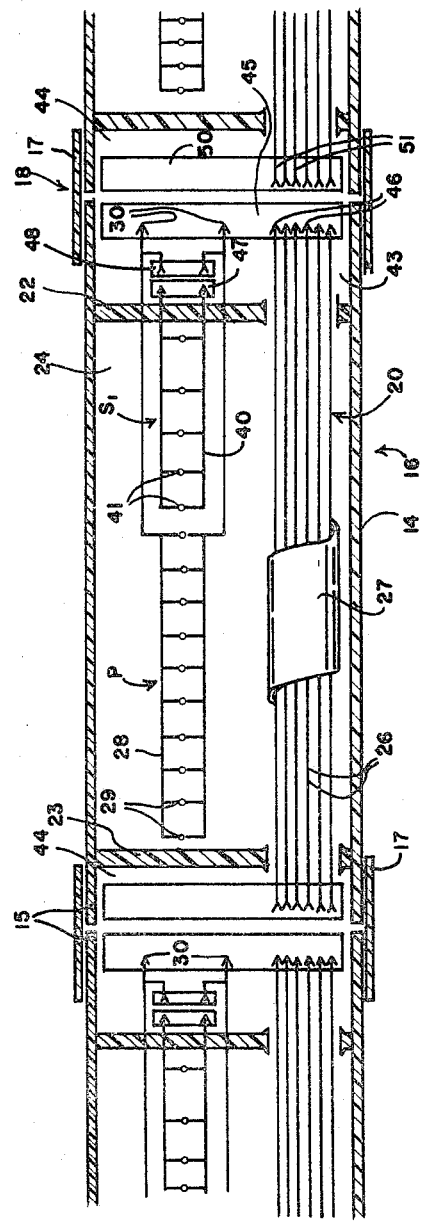
FIGURE 2 shows diagrammatically and partly in section one embodiment of a streamer section having extendable arrays.

As can be seen in greater detail in FIGURE 2, near the flanges 15 of pipe 14 are positioned cylindrical end seals 22, 23. A chamber 24 is formed by the volume defined by the inner walls of pipe 14 and of seals 22, 23. Chamber 24 is made to contain, in a conventional manner, a suitable fluid, typically light oil. End seals 22, 23 are made of a relatively hard plastic material such as neoprene or Teflon. Cable 20 consists of a plurality of electric signal carrying conductors 26, which may be covered by a protective plastic jacket 27. While only a few conductors 26 are shown, in practice as many as 92 or more conductors are used to form cable 20.

Cable 20 provides to each section 16 a separate pair of conductors 28 across which are connected in parallel a plurality of pressure transducers or hydrophones 29. Hydrophones 29 convert pressure variations in the water surrounding the flexible pipe 14 into corresponding electric signals or voltages which appear at male pins 30 electrically connected to conductors 28. The number of hydrophones 29 connected in parallel, their individual sensitivity characteristics, and their relative spacings along conductors 28 may be selected to meet the requirements of known design criteria. On the other hand, hydrophones 29 may have the same characteristics and may be uniformly spaced along conductors 28. After the characteristics of hydrophones 29 are selected and their layout pattern determined, hydrophones 29 form a primary array P. Primary array P delivers to pins 30 an electric signal $e_p$ representing the combined output signals from hydrophones 29. Signal $e_p$ at pins 30 is determined both by the amplitude and phase of each signal produced by each of hydrophones 29 forming primary array P.

In accordance with the present invention at least one other pair of conductors 40 is provided within each chamber 24. Across conductors 40 are again connected in parallel a plurality of hydrophones 41. Preferably hydrophones 41 are so selected and positioned along conductors 40 as to form a weighted secondary array $S_1$. Again, hydrophones 41, in response to water pressure variations, generate individual electric signals which are combined to produce a resultant electric signal $e_{s_1}$ at male pins 42. Thus for each primary array P producing a primary resultant electrical signal $e_{p_1}$, there is a secondary array $S_1$ producing a secondary resultant electric signal $e_{s_1}$.

As previously mentioned, primary array P and secondary array $S_1$ are enclosed in oilproof chamber 24. Other elements such as strain cables, spacers, etc., which are conventionally provided in streamer sections are omitted from the drawings for the sake of clarity. Conductors 28 and 40, cable 20, as well as said other elements (not shown), pass through the end seal 22 in a leakproof manner. The inner cylindrical walls of flanges 15 and the outer walls of end seals 22 and 23 form open-ended chambers 43, 44, respectively. Positioned in chamber 43 is a multipin male plug 45 which in addition to housing pins 30 also houses pins 46 terminating conductors 26 of cable 20. Also provided in chamber 43 is a male plug 47 carrying pins 42 and a female plug 48 carrying pins 49 which are electrically connected to conductors 28.

When plugs 47 and 48 are disconnected, the secondary array $S_1$ is "floating." On the other hand, when plugs 47 and 48 are connected, the secondary signal $e_{s_1}$ is combined with the primary signal $e_p$ to yield a composite electrical signal $e_c$ at pins 30. Thus it is possible to selectively provide a relatively short primary array P or a relatively long composite array $C_1$ consisting of P and $S_1$ connected in parallel. Since the selective coupling of intrasection arrays P and $S_1$ is performed within open-ended chamber 43, both the integrity of the arrays and the oilproofness of chamber 24 are preserved.

In the open-ended chamber 44 of the next following section 16 there is provided a multicontact female plug 50 carrying pins 51 for detachably connecting with the corresponding pins 46 of male plug 45. When plugs 45 and 50 are connected, the electric signals delivered by the primary array P or the composite array $C_1$ will be transmitted through cable 20 to an individual recording channel within the recording equipment on ship 12. To establish the joint 18, both flanges 15 of adjacent sections 16 are brought together end to end. Collar 17 is then placed over flanges 15 to provide a leakproof joint 18. Suitable clamps (not shown) may be added for additional sealing protection.

Figure 3:
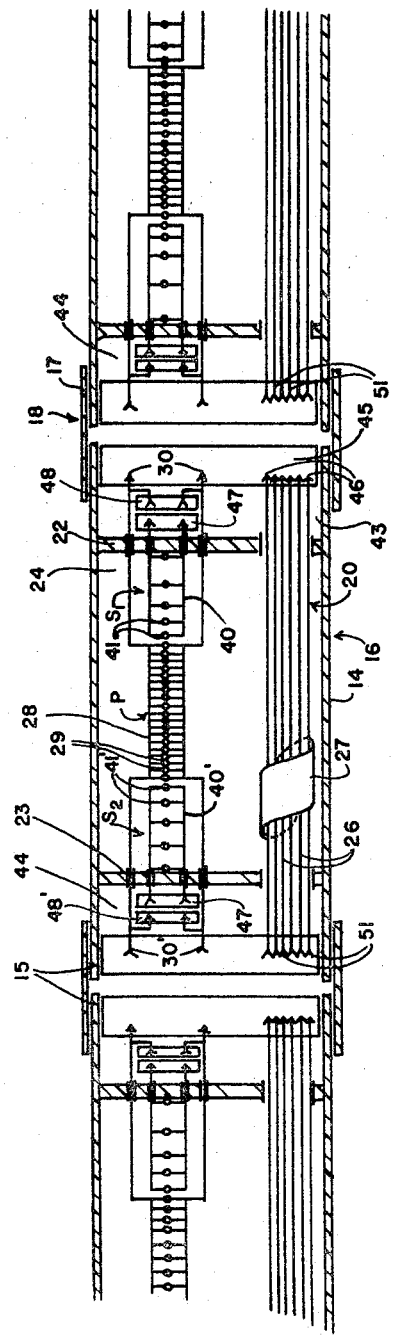
FIGURE 3 shows diagrammatically and partly in section another embodiment of a streamer section having extendable arrays.

FIGURE 3 shows a preferred embodiment of this invention wherein section 16 in addition to primary array P has at least two secondary arrays $S_1$ and $S_2$. Except for the addition of secondary array $S_2$, and suitable coupling means therefore, the embodiment shown in FIGURE 3 is in all respects similar to the one shown in FIGURE 2. There is now provided in chamber 24 another pair of conductors $40^1$ across which are connected in parallel a plurality of hydrophones $41^1$ to form the second secondary array $S_2$. Because the second secondary array $S_2$ is conveniently made the image of the first secondary array $S_1$ with respect to the center of primary array P, the numerals assigned to components connected with the secondary array $S_2$ are the same as their corresponding parts connected with the first secondary array $S_1$ but with a prime added. Thus it will now be appreciated that the field operator can provide to pins 30 the output signal $e_p$ of primary array P, or the composite output signal $e_{c_1}$ formed of $e_p$ and $e_{s_1}$, or the composite signal $e_{c_2}$ formed of $e_p$, $e_{s_1}$ and $e_{s_2}$.

In other words, the field operator can easily extend the primary array P into a first composite array $C_1$, consisting of P and $S_1$, and into a second composite array $C_2$, consisting of P, $S_1$ and $S_2$. Primary array P is therefore extendable inside each section into composite arrays $C_1$ and $C_2$ the interconnections to which are located at the end of each section outside the waterproof chamber 24. Secondary arrays $S_1$ and $S_2$ can be conveniently tapered to achieve higher resolution of certain selected frequency signals and hence of subsurface detail. Moreover, since the streamer sections 16 are interchangeable they can be easily assembled, much like building blocks, into full streamers by reconnecting joints 18 with collars 17.

It is therefore apparent from the foregoing that the invented extendable intrasection hydrophone arrays have configuration parameters which can be easily altered in the field and in which mathematically or experimentally determined interahydrophone spacings are so optimized as to provide maximum noise rejection throughout the entire frequency band of interest. The arrays can be used in either tapered or nontapered configurations by merely performing minor interconnections in the field. Yet another advantage of the present invention is that the extendable intrasection arrays can be easily interconnected to adjoining extendable arrays to selectively form desirable long hydrophone configurations.

Figure 4:
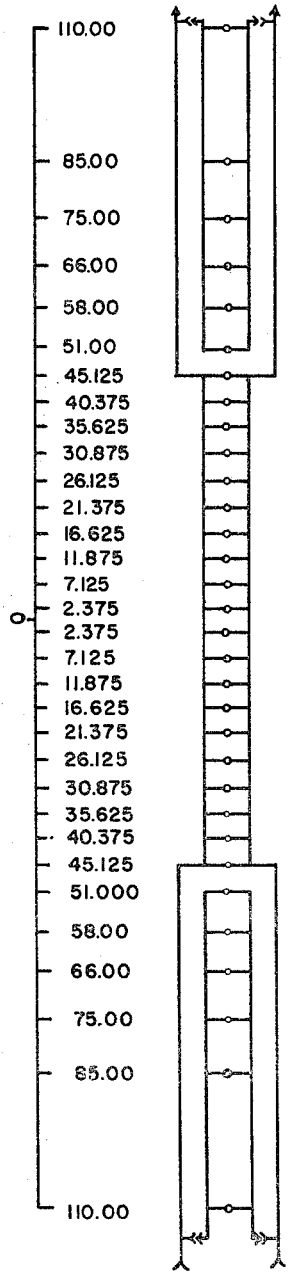
FIGURE 4 shows a physical layout of the arrays in the section shown in FIGURE 3.

FIGURE 4 shows a configuration layout of the extendable intrasection hydrophone arrays shown in FIGURE 3. The total length of the composite array $C_2$ is about two hundred and ten feet. The primary array P is about ninety feet long and each of the secondary arrays $S_1$ and $S_2$ is about sixty feet long. Primary array P may have twenty hydrophones evenly spaced, and each of the secondary arrays $S_1$ and $S_2$ may have six hydrophones. The intrahydrophone spacings in the secondary arrays increase from the center of section 16 toward the ends of section 16, in accordance with a desired tapering function. Thus the primary array P can be conveniently extended into a tapered array $C_2$.

Although this invention has been disclosed and illustrated with reference to particular applications, the principles involved are susceptible of numerous other applications which will be apparent to persons skilled in the art. The invention is therefore to be limited only as indicated by the scope of the appended claims.

What I claim is:

1. A marine seismic streamer cable for detecting water pressure variations caused by seismic disturbances and for converting these variations into corresponding electric signals to be transmitted by the cable to processing equipment, said cable including:
   a plurality of detachably coupled streamer sections;
   each of said sections including a first plurality of detectors suitably interspaced to form a primary array;
   at least one of said sections including,
      a second plurality of detectors suitably interspaced to form a first secondary array, and
      means at one end of said one section for detachably coupling said secondary array to the primary array of said one section to form a composite array; and
   means for detachably coupling said primary arrays to each other at the ends of said streamer sections to provide said signals to said processing equipment.

2. The streamer cable of claim 1 wherein,
   said one section further includes a third plurality of detectors suitably interspaced to form a secondary array, and
   means for detachably coupling said second array with the primary array of said one secton at the other end of said one section.

3. The streamer cable of claim 2 wherein,
   said first and said second secondary arrays are tapered.

4. The streamer cable of claim 2 wherein,
   each streamer section includes a tubular flexible housing having at each of its ends a seal whereby a fluid-proof chamber is defined by the inner walls of said housing and of said seals, and
   said detachable coupling means, operatively associated with the primary arrays of said sections and with the secondary arrays of said one section, are positioned outside of said chamber.

5. The streamer cable of claim 4 wherein,
   said primary array in said one section is symmetrically positioned with respect to the center of said one section and each of said secondary arrays lies between opposite ends of said section and said primary array.

6. The streamer cable of claim 4 wherein,
   each primary array is coupled to a section of a trunkline extending throughout said streamer cable.

7. The streamer cable of claim 6 wherein,
   each of said sections has a flexible sleeve adapted to couple said streamer sections and to render said coupling means waterproof.

References Cited

UNITED STATES PATENTS 3,299,397  1/1967  Pavey et al. _____ 340—7

RODNEY D. BENNETT, JR., *Primary Examiner.*

CHARLES E WANDS, *Assistant Examiner.*

U.S. Cl. X.R.

181—.5